(12) United States Patent
Watanabe et al.

(10) Patent No.: US 9,818,997 B2
(45) Date of Patent: Nov. 14, 2017

(54) RUBBER VALVE BODY FOR SEALED BATTERY, SAFETY VALVE DEVICE AND ALKALINE STORAGE BATTERY

(71) Applicant: GS Yuasa International Ltd., Kyoto-shi, Kyoto (JP)

(72) Inventors: Hideto Watanabe, Kyoto (JP);
Toshiyuki Nukuda, Kyoto (JP);
Mitsuhiro Kodama, Kyoto (JP);
Manabu Kanemoto, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 93 days.

(21) Appl. No.: 14/107,036

(22) Filed: Dec. 16, 2013

(65) Prior Publication Data

US 2014/0170444 A1 Jun. 19, 2014

(30) Foreign Application Priority Data

Dec. 18, 2012 (JP) ................................ 2012-275358

(51) Int. Cl.
*H01M 2/12* (2006.01)
*H01M 10/34* (2006.01)
*H01M 2/08* (2006.01)

(52) U.S. Cl.
CPC ....... *H01M 2/1229* (2013.01); *H01M 2/1282* (2013.01); *H01M 10/345* (2013.01); *H01M 2/08* (2013.01); *Y02E 60/124* (2013.01)

(58) Field of Classification Search
CPC ...................................................... H01M 2/08
USPC ...................... 429/53–93, 96–100, 163–187; 29/623.1–623.5
See application file for complete search history.

(56) References Cited

U.S. PATENT DOCUMENTS

| | | | |
|---|---|---|---|
| 3,124,487 A * | 3/1964 | Duddy et al. ................. | 429/499 |
| 5,712,056 A | 1/1998 | Matsumasa et al. | |
| 6,071,643 A * | 6/2000 | Chino et al. .................. | 429/176 |
| 7,007,715 B2 | 3/2006 | Nakayama et al. | |
| 7,670,715 B2 | 3/2010 | Schubert | |
| 7,919,202 B2 | 4/2011 | Schubert et al. | |
| 7,923,137 B2 | 4/2011 | Schubert et al. | |
| 2002/0068221 A1* | 6/2002 | Watanabe ............... | H01M 2/08 429/231.5 |
| 2002/0127467 A1* | 9/2002 | Watanabe ............... | H01M 2/08 429/90 |
| 2003/0017393 A1* | 1/2003 | Nemoto .................. | H01M 2/08 429/185 |

(Continued)

FOREIGN PATENT DOCUMENTS

EP 1447600 8/2004
JP 04-036954 2/1992

(Continued)

OTHER PUBLICATIONS

Machine Translation of Takeshi (JPH11-238495, published Aug. 1999, pp. 1-9).*

(Continued)

*Primary Examiner* — Imran Akram
(74) *Attorney, Agent, or Firm* — Rankin, Hill & Clark LLP

(57) ABSTRACT

A rubber valve body for sealed battery includes a rubber composition containing a resin in an amount of 20% by mass or more and an inorganic substance, wherein the melting point of the resin is in a range of 100 to 165° C.

8 Claims, 4 Drawing Sheets

(56) References Cited

U.S. PATENT DOCUMENTS

| | | | |
|---|---|---|---|
| 2003/0035993 A1* | 2/2003 | Enomoto | H01M 2/0413 429/66 |
| 2003/0055179 A1* | 3/2003 | Ota | B32B 27/32 525/242 |
| 2003/0180609 A1* | 9/2003 | Yamashita | H01M 2/021 429/185 |
| 2004/0219424 A1* | 11/2004 | Kanno | H01M 2/08 429/137 |
| 2005/0039806 A1* | 2/2005 | Nakayama | F16K 17/0453 137/853 |
| 2005/0079405 A1* | 4/2005 | Enomoto | H01M 2/1229 429/54 |
| 2005/0079413 A1* | 4/2005 | Schubert | H01M 2/08 429/185 |
| 2005/0167474 A1* | 8/2005 | Kanno | B23K 20/10 228/183 |
| 2008/0226982 A1 | 9/2008 | Schubert | |
| 2010/0003583 A1* | 1/2010 | Seong | H01M 2/0478 429/72 |
| 2010/0119953 A1* | 5/2010 | Watanabe | H01M 10/0567 429/332 |
| 2012/0225349 A1 | 9/2012 | Schubert | |
| 2013/0177803 A1* | 7/2013 | Kugino | H01M 2/0404 429/179 |
| 2013/0307227 A1* | 11/2013 | Ueda | F16J 15/062 277/648 |

FOREIGN PATENT DOCUMENTS

| | | | | |
|---|---|---|---|---|
| JP | 07-085853 | 3/1995 | | |
| JP | 9-237620 | 9/1997 | | |
| JP | 11-238495 | 8/1999 | | |
| JP | 2006-092864 | 4/2006 | | |
| JP | 5043249 | 10/2012 | | |
| JP | WO 2013046322 A1 * | 4/2013 | | H01M 2/08 |
| WO | 2011/158822 | 12/2011 | | |

OTHER PUBLICATIONS

Kodama, Soji. "Development of High Performance Elastomers with Inorganic Filler. 1. Effects of Inorganic Fillers on the Properties of Vulcanizates," Journal of the Society of Rubber Science and Technology, Japan vol. 78, No. 1, pp. 38-44, 2005.; English abstract.

Extended European Search Report dated Mar. 25, 2014 filed in the corresponding European patent application No. 13197632.6.

* cited by examiner

RUBBER VALVE BODY FOR SEALED BATTERY, SAFETY VALVE DEVICE AND ALKALINE STORAGE BATTERY

CROSS-REFERENCE TO RELATED APPLICATIONS

This application claims the benefit of Japanese patent application No. 2012-275358, filed on Dec. 18, 2012, which is incorporated by reference.

FIELD

The present invention relates to a rubber valve body for sealed battery, a safety valve device and an alkaline storage battery.

BACKGROUND

Alkaline storage batteries as sealed batteries have heretofore employed a pressure adjustment mechanism configured as follows. A sealing plate fixedly provided with a cap member is arranged at the open end of a bottomed cylindrical container case, and the open end edge of the container case is crimped through a gasket to close the upper part of the container case. An exhaust valve hole is provided, for example, at the central part of the sealing plate, the valve hole is airtightly sealed by a robber valve body arranged in a compressed state in a valve chamber surrounded by the sealing plate and the cap member during a normal period, and an internally accumulated gas is exhausted, by opening the valve hole when the gas pressure of the inside of the battery increases.

However, in the case where the temperature of the inside of the battery becomes an abnormally high temperature such as a temperature higher than 100° C. when rapid discharge occurs due to an external short circuit or when the battery is exposed under a high temperature, the rubber valve body is expanded, or the elastic modulus of the rubber valve body is changed. Thus, the pressure adjustment, mechanism may fail to operate, leading to an increase in pressure of the inside of the battery.

In the case of a nickel-metal hydride storage battery using a hydrogen-storage alloy for a negative electrode, when the temperature rises, the equilibrium pressure of the hydrogen-storage alloy which stores hydrogen increases, leading to a rapid increase in pressure of the inside of the battery. Thus, the pressure adjustment function may not be exhibited.

When the temperature of the inside of the battery becomes equal to or higher than 165° C., which is a melting point of a commonly-used resin-made separator, the resin-made separator may be melted, leading to an internal short-circuit.

Further, external components made of resin may be eroded as the surface temperature of the battery rises during rapid discharge due to an external short circuit or the like.

In relation to this, JP-A-9-237620 proposes that, by including 5 to 30% by weight of polypropylene in a rubber valve body a valve operating pressure at a high temperature can be reduced to cope with a change in internal pressure with a rapid rise in temperature of a battery. In JP-A-9-237620, it is intended that when an excessive pressure alter rapid temperature rise is released, 20 to 60% of the valve operating pressure is maintained at a high temperature, and a gas vent port is prevented from being opened. In such a rubber valve body, the amount of internally accumulated heat cannot be sufficiently released, and thus thermal runaway with a rapid temperature rise may occur. Therefore, the temperature of the battery may become higher to erode components existing outside the battery.

As described in JP-A-9-237620, natural rubber, SBR rubber and ethylene propylene rubber are proposed as elastic materials. Among them, ethylene propylene rubber is most excellent, but due to a time-dependent change in rubber elasticity, it is difficult to make settings for ensuring long-term reliability such as inhibition of leakage of an electrolyte solution.

SUMMARY

The following presents a simplified summary of the invention disclosed, herein in order to provide a basic understanding of some aspects of the invention. This summary is not an extensive overview of the invention. It is intended to neither identify key or critical elements of the invention nor delineate the scope of the invention. Its sole purpose is to present, some concepts of the invention in a simplified form as a prelude to the more detailed description that is presented later.

The present invention has been devised to provide a rubber valve body for sealed battery capable of significantly reducing a valve operating pressure by rapid beat degradation when the temperature of the inside of a battery abnormally rises, a safety valve device using the rubber valve body, and an alkaline storage battery formed by using the same.

The present inventors have conducted extensive studies, and resultantly found that when a predetermined amount of a resin and an inorganic substance are included together in a rubber composition that forms a rubber valve body, moderate elasticity is imparted to the rubber valve body to secure normal operations of a pressure adjustment mechanism in a normal state in which the temperature of the inside of a battery is 100° C. or lower, but the rubber valve body can be heat-degraded to reduce the pressure of the inside of the battery when the temperature of the inside of the battery abnormally rises to a temperature higher than 100° C. The present invention has been completed on the basis of the above-described findings.

Heat degradation of the rubber valve body when the temperature of the inside of the battery abnormally rises to a temperature higher than 100° C. is ascribable to coexistence of a resin, having fluidity and an inorganic substance having no fluidity. A softening behavior of a general resin with beat proceeds slowly with respect to a temperature. Therefore, at a temperature lower than an intended degradation temperature, softening is started to cause heat degradation of the rubber valve body. On the other hand, when an inorganic substance having no fluidity at a high temperature coexists, slow heat degradation of the rubber valve body associated with the slow softening of the resin can be prevented to cause rapid heat degradation at an intended degradation temperature. It is thought that the rubber valve body is rapidly heat-degraded to cause a significant reduction in valve operating pressure.

That is, a rubber valve body for sealed battery according to an aspect of the present invention includes a rubber valve body including a rubber composition, containing a resin, in an amount of 20% by mass or more and an inorganic substance, wherein the melting point of the resin is in a range of 100 to 165° C.

BRIEF DESCRIPTION OF THE DRAWINGS

The foregoing and other features of the invention will become apparent to one skilled in the art to which the present invention relates upon consideration of the invention with reference to the accompanying drawings, wherein.

DETAILED DESCRIPTION

Figure 1:
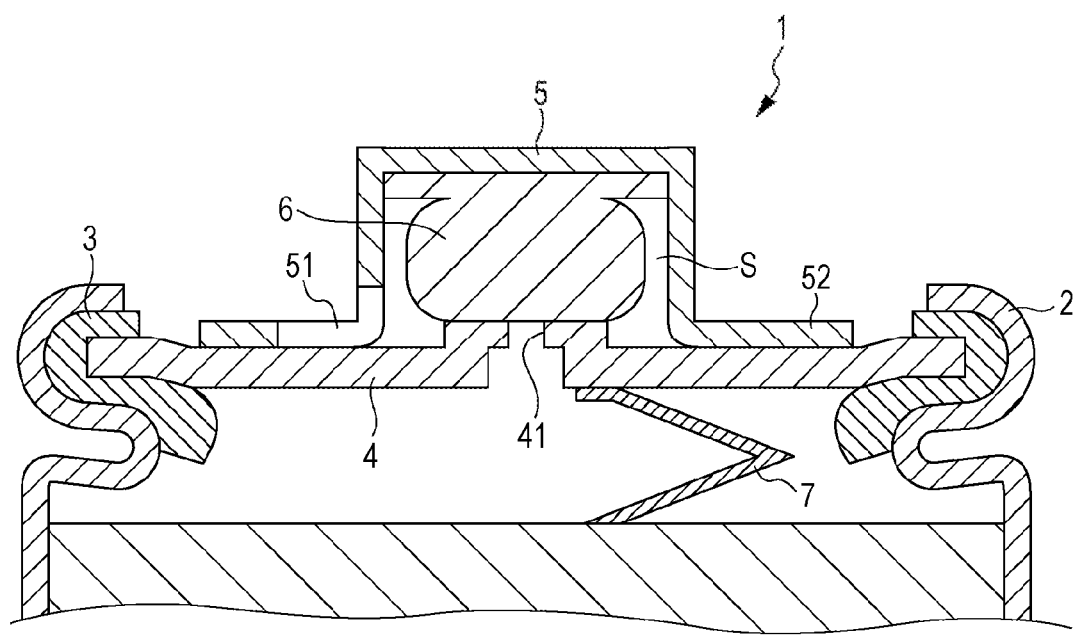
FIG. 1 is a sectional view of a part of an alkaline storage battery according to one embodiment of the present invention.

Aspects of the present invention will, be described hereinafter.

A rubber valve body for sealed battery according to a first aspect of the present invention includes a rubber valve body including a rubber composition containing a resin in an amount of 20% by mass or more and an inorganic substance, wherein the melting point of the resin is in a range of 100 to 165 ° C.

The resin is one having a melting point equal to or lower than that of a resin used for a separator. As described above, the melting point of a resin that is used for a general separator is about 165° C., and the melting point of the resin to be used for the rubber valve body in the present invention is equal to or lower than, this temperature. Therefore, the resin to be used for the rubber valve body is a resin having a melting point ranging from 100 to 165° C. As the resin, a thermoplastic resin is suitably used, and polyolefin is especially suitably used. As the inorganic; substance, zinc oxide is especially suitably used.

Preferably, the rubber composition has an endothermic peak at 100 to 150° C.

Preferably, the rubber composition contains an inorganic substance in an amount of 5 to 17% by mass.

Preferably, the rubber composition contains a resin in an amount of 40% by mass or less.

The degree of crystallinity of a resin contained in the rubber composition is preferably 9 to 12%.

A second aspect of the present invention provides a safety valve device formed by using the rubber valve body according to the first aspect of the present invention. That is, the safety valve device according to the second aspect of the present invention includes a sealing plate provided with an exhaust valve hole, a cap member fixedly attached on the outer surface of the sealing plate and provided, with a vent hole, and the rubber valve body of the first aspect of the present invention arranged in a valve chamber surrounded by the sealing plate and the cap member.

A third aspect of the present invention provides an alkaline storage battery using the rubber valve body according to the first aspect of the present invention.

A fourth aspect of the present invention provides an alkaline storage battery formed by using the safety valve device according to the second aspect of the present invention. That is, the alkaline storage battery according to the fourth aspect of the present invention includes a bottomed container case opened at one end, and the safety valve device of the second aspect of the present invention provided so as to close the open end of the bottomed container case.

When the safety valve device is mounted in the alkaline storage battery the content of a resin in the rubber composition is preferably 25 to 40% by mass.

According to the aspects of the present invention having the configuration described above, when the temperature of the inside of a battery abnormally rises, a valve operating pressure can be significantly reduced by rapid heat degradation of a rubber valve body, so that the pressure of the inside of the battery can be reduced.

An embodiment, of an alkaline storage battery according to the present invention will be described below.

The alkaline storage battery is that of sealed type, and includes a bottomed container case, a sealing plate, a cap member, and a rubber valve body. A bottomed container case is opened at one end. A sealing plate is arranged so as to close the open end of the bottomed container case and provided with an exhaust valve hole at the central part. A cap member is fixedly attached on the outer surface of the sealing plate and provided with a vent hole. A robber valve body is arranged, in a compressed stale in a valve chamber surrounded by the sealing plate and the cap member and being capable of airtightly sealing the valve hole of the sealing plate. In the alkaline storage battery the sealing plate, the cap member and the rubber valve body form a safety valve device.

Examples of the alkaline storage battery include that of an embodiment shown in FIG. 1. A sealed alkaline storage battery 1 according to this embodiment includes a metallic bottomed container case 2 housing a winding-type electrode group (not shown), a metallic sealing plate 4 is arranged on the upper open end thereof with a gasket 8 formed of a polyamide resin or a polyolefin resin interposed therebetween, and a positive electrode plate of the winding-type electrode group (not shown) is electrically connected to the sealing plate 4 by a positive electrode lead 7. A flange portion 52 of a cap member 5 also serving as a positive electrode terminal is bonded to the outer surface of the sealing plate 4. A rubber valve body 8 in a compressed state is arranged in a valve chamber S surrounded by the sealing plate 4 and the cap member 5. A valve hole 41 provided at the central part of the sealing plate 4 is airtightly sealed by the rubber valve body 6 during a normal period, but when a gas is accumulated in the alkaline storage battery 1 to increase the pressure of the inside of the battery, the valve hole 41 is opened, and the accumulated gas is exhausted to outside through the valve hole 41 and a vent hole 51 provided in the cap member 5.

The rubber valve body includes a rubber composition containing a resin having a melting point at 100 to 165° C. and an inorganic substance, the content of the resin being 20% by mass or more.

As described above, the resin content of the rubber composition that forms the rubber valve body is as high as 20% by mass or more, and by ensuring that the content of the resin is 20% by mass or more, the rubber valve body can be made to have an endothermic peak temperature of 100 to 150° C. Therefore, when the temperature of the inside of the battery abnormally rises to a temperature higher than 100° C., the rubber valve body is heat-degraded to reduce the hardness, so that the valve hole can be opened to exhaust a gas in the battery.

Another component of the rubber composition, is preferably ethylene propylene rubber. Examples of ethylene propylene rubber for use include ethylene-propylene rubber (EPA) and ethylene-propylene-diene rubber (EPDM). Among them, EPDM is suitably used because it has high chemical resistance. When the ethylene propylene rubber is EPDM, other component is not particularly limited, and examples thereof include ethylidene norbornene (ENB), 1,4-hexadiene (1,4-HD) and dicyclopentadiene (DCP).

The resin for use is preferably a resin having crystallinity such as for example, a polyolefin-based resin such as polyethylene or polypropylene, a polyester resin such, as polyethylene terephthalate (PET) or polybutylene terephthalate (PBT), a polyamide resin or a polyacetal resin. The resin is not particularly limited as long as it has a melting point of about 100 to 165° C. A resin having no crystallinity, such as a styrene-based resin such as polystyrene, an acrylonitrile-styrene (AS) resin or an acrylonitrile-butadiene-styrene (ABS) resin, a vinyl-based resin such as polyvinyl chloride, an acryl-based resin such as polymethyl methacrylate or a polycarbonate (PC) resin can also be used in the form of a mixture or a copolymer. In particular when polypropylene is used as a resin, the endothermic peak temperature can be adjusted to 140 to 150° C., so that before the temperature of the inside of the battery reaches 165° C., a melting temperature of a general resin-made separator, an excessive pressure can be reliably released and a rise in temperature of the battery can be suppressed by heat degradation of the rubber valve body. Preferably the resin has resistance to an alkaline electrolyte solution.

The content of the resin in the rubber composition is 20% by mass or more, preferably 20 to 40% by mass, further preferably 25 to 40% by mass. When the content of the resin is less than 20% by mass, the endothermic peak temperature does not decrease. When the content of the resin is more than 40% by mass, the rubber valve body obtained becomes so hard that it is difficult to function as a restorable valve having elasticity. When the content of the resin is 25% by mass or more, the valve operating pressure of the rubber valve body is reduced to a pressure equal to or less than the vapor pressure of water to cause a decrease in battery temperature and an increase in internal resistance by evaporation of an electrolyte solution, so that a rapid temperature rise due to thermal runaway of the battery can he prevented. The content of the resin is particularly preferably more than 30% by mass. When the content of the resin is mere than 30% by mass, the valve operating pressure can be rapidly reduced, so that a rise in surface temperature of the battery can be suppressed.

Preferably, the rubber composition contains zinc oxide. When zinc oxide is contained, moderate elasticity is imparted to the rubber valve body. The content of zinc oxide in the rubber composition is preferably 1 to 9% by mass, more preferably 4 to 6% by mass.

For enhancing the hardness of the rubber valve body at normal temperature, the rubber composition may contain carbon black or white filler. The white filler is not particularly limited, and examples thereof include carbonates such as chalk, heavy calcium carbonate, light calcium carbonate, ultra-fine calcium carbonate, special calcium carbonate and basic magnesium carbonate; silicates such as kaolin (kaolinite, halloysite, etc.), pyrophyllite (pyrophyllite clay), calcined clay talc, hydrous aluminum silicate and hydrous calcium silicate; silicic acids such as hydrous fine-powdered silicic acid and anhydrous fine-powdered silicic acid; aluminum hydrates such as hydrous aluminum hydroxide; and barium sulfates such, as precipitated barium sulfate.

The content, of inorganic substances including zinc oxide, carbon black and the white filler is preferably 5 to 17% by mass, more preferably 5 to 15% by mass. When the content of the aforementioned inorganic substances is more than 17% by mass, the hardness of the rubber valve body becomes extremely high, and therefore the valve operating pressure increases, so that a problem may occur in operation of the safety valve device at normal temperature. The content of carbon black is preferably 12% by mass or less. When the content of carbon black is more than 12% by mass, problems may occur such as popping out and deformation of the cap member. Preferably the inorganic substance has alkali resistance from the viewpoint of stability of the rubber valve body.

The rubber composition may further contain previously known rubber compounding agents such as a vulcanizing agent as well as a vulcanizing aid, a filler such as calcium hydroxide, a vulcanizing accelerator, a plasticizer, a stabilizer, a processing aid and a colorant.

The degree of crystallinity of the resin in the rubber composition is preferably 9 to 12%. When the degree of cryslallinity is less than 9%, the rubber valve body is too soft to achieve moderate elasticity, and when the degree of crystallinity is more than 12%, the rubber valve body may be excessively hard and therefore become brittle.

EXAMPLES

The present invention will be described further in detail below by showing Examples, but the present invention is not limited to these Examples.

<Test 1>

A rubber valve body was prepared using each rubber composition having the polypropylene content shown in Table 1 below, a safety valve device shown in FIG. 1 was assembled, and the following tests were conducted. Each rubber composition contains talc and zinc oxide in amounts of 5% by mass, respectively, in addition to polypropylene, the remainder being EPDM.

TABLE 1

|  |  | Polypropylene content (% by mass) |
|---|---|---|
| Comparative Example |  | 8.5 |
| Examples | 1 | 20 |
|  | 2 | 25 |
|  | 3 | 30 |
|  | 4 | 35 |
|  | 5 | 40 |

(1) Valve Operating Pressure Test

Figure 2:
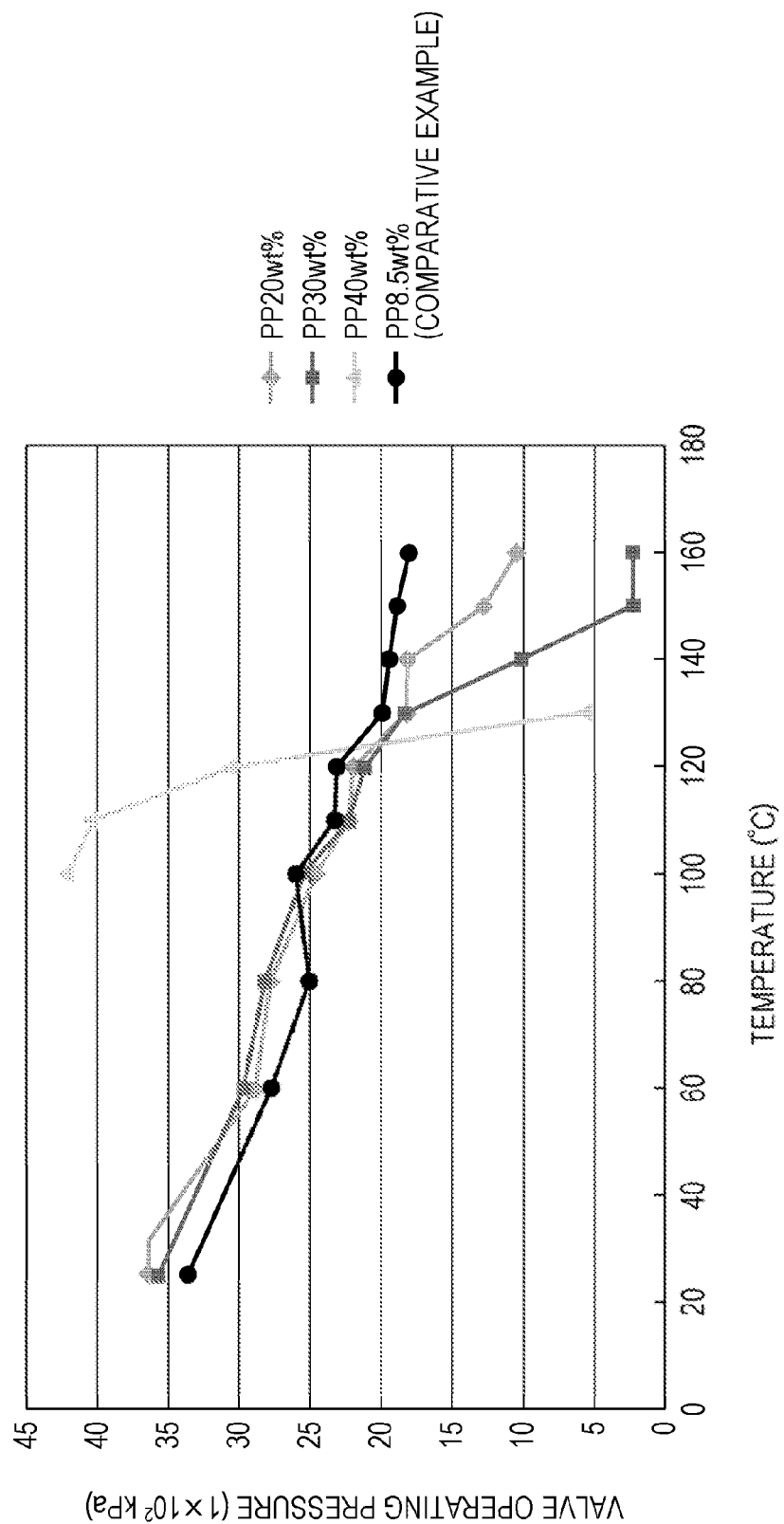
FIG. 2 is a graph showing a change in valve operating pressure depending on a temperature in a safety valve device of each of Examples and Comparative Example in test 1.
Figure 3:
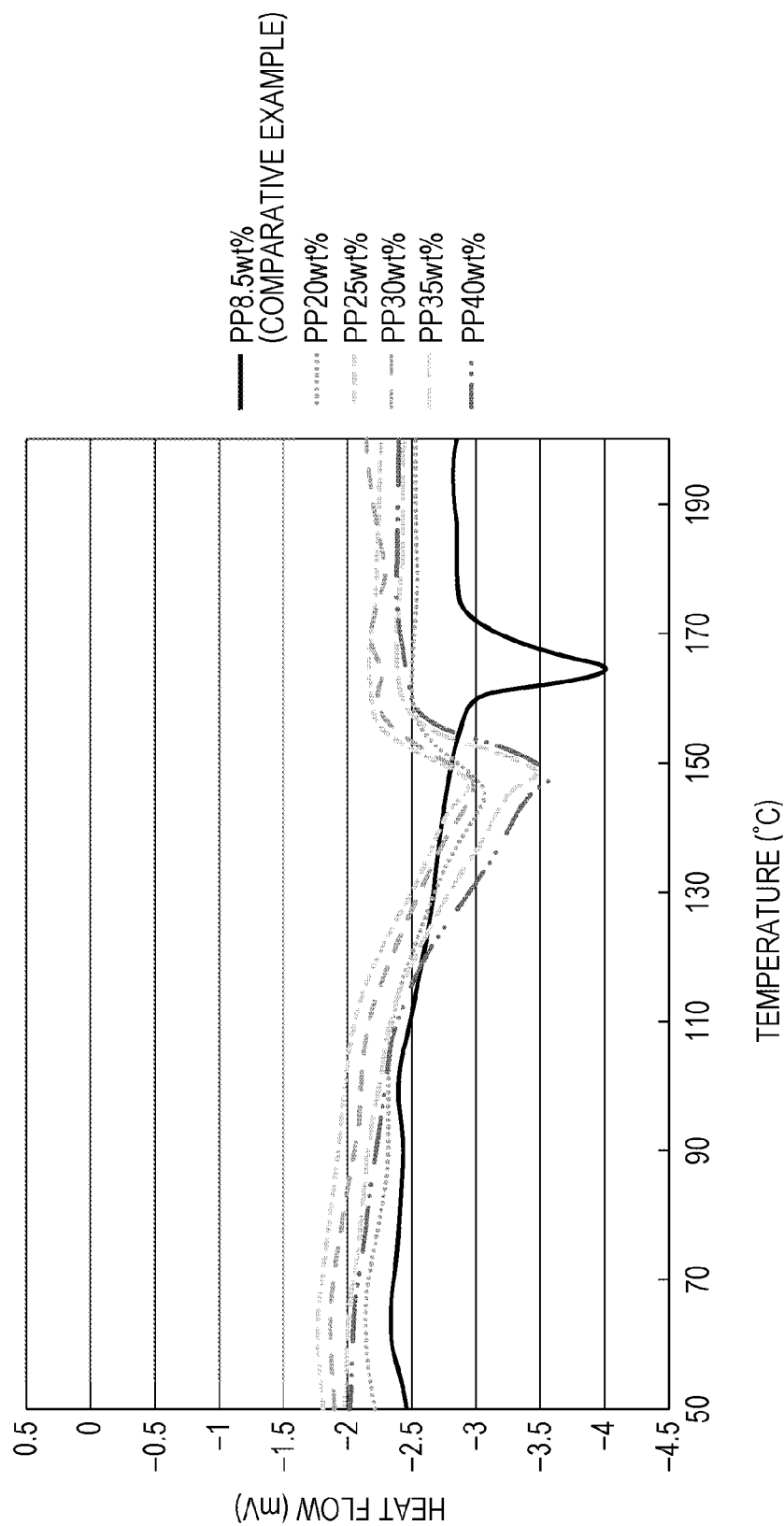
FIG. 3 is a DSC curve for a robber valve body of each of Examples and Comparative Example in test 1.

After the safety valve device was left at each temperature for 1 hour, a valve operating pressure was measured in a valve operating pressure testing apparatus. The results are shown in FIGS. 2 and 3. For the safety valve device using a rubber valve body having a poly propylene content of 40% by mass (Example 5), a valve operating pressure was measured within a range of 100 to 130° C.

(2) DSC (Differential Scanning Calorimetry) Test

For the rubber valve body of each of Examples and Comparative Example, a measurement was performed from room temperature to 300° C. at a temperature rise rate of 10° C./min using a Pt pan in a DSC apparatus (TG/DTA 2000SA manufactured by Bruker Corporation) under an Ar atmosphere. The obtained DSC curves are shown in FIG. 3. A degree of crystallinity was determined by analyzing an endothermic peak in the DSC curve using Thermal Analysis System WS003 manufactured by Bruker AXS Corporation. The obtained degrees of crystallinity are shown in Table 2 below.

In the present invention, an inorganic substance such, as zinc oxide is included in rubber, so that an endothermic peak temperature ascribed to melting of polyolefin included in the rubber valve body is lower than the intrinsic melting point of the polyolefin included in the rubber valve body. The decrease in melting point results from a decrease in degree of crystallinity, and the reason for the decrease in degree of crystallinity is thought to be because recrystallization of polyolefin is hindered as an inorganic substance such as zinc oxide is incorporated into a large group of polyolefin. When the amount of polyolefin contained is small and a rubber component and polyolefin are uniformly mixed, polyolefin are scattered in the form of a small group. On the other hand, when the amount of polyolefin contained is large, polyolefin is in the form of a large group, and forms a network. Therefore, when an inorganic substance such as zinc oxide is added, a large group of polyolefin and the inorganic substance are sufficiently mixed. The intrinsic melting point of polypropylene is 160 to 175° C.

Softening characteristics of polyolefin are reflected in the properties of the rubber valve body as polyolefin in the rubber component forms a network. Since rubber properties are maintained up to a softening point of polyolefin due to existence of an inorganic substance as described above, the valve operating pressure is rapidly reduced.

TABLE 2

| | Degree of crystallinity (%) |
|---|---|
| Comparative Example | 15.51 |
| Examples 1 | 9.58 |
| 2 | 10.03 |
| 3 | 9.26 |
| 4 | 10.85 |
| 5 | 10.39 |

(3) External Short-Circuit Test

A nickel-metal hydride storage battery having an AA size rated capacity of 2100 mAh was prepared using the safety valve device of each of Examples and Comparative Example. As a separator of the battery a polyethylene/polypropylene resin fiber non woven fabric subjected to a sulfonation treatment was used. Four cells of the battery were connected in series, and charged at 0.1 C for 16 hours, an external resistor of 50 mO was connected, the surface temperature of the battery at this time was measured for all of the four cells, and the maximum temperature was shown in the graph of FIG. 4.

<Test 2>

A rubber valve body was prepared using each of rubber compositions with the carbon black content varied within a range of 0 to 20% by mass, a safety valve device shown in FIG. 1 was assembled, and a valve operating pressure test was conducted. Each rubber composition contains polypropylene in an amount of 30% by mass and talc and zinc oxide in amounts of 5% by mass, respectively, in addition to carbon black, the remainder being EPDM. The results are shown in Table 3.

TABLE 3

| | | Valve operating pressures (1 × 10² kPa) Temperature (° C.) | | | | | | | | | |
|---|---|---|---|---|---|---|---|---|---|---|---|
| | | 25 | 80 | 100 | 110 | 120 | 130 | 140 | 150 | 160 | 170 | 180 |
| Carbon black content (% by mass) | 0 | 35.34 | 26.04 | 24.60 | 21.84 | 19.16 | 16.80 | 7.14 | 3.18 | 1.98 | 2.00 | 2.06 |
| | 5 | 37.52 | 26.62 | 23.28 | 22.46 | 21.48 | 19.42 | 5.86 | 2.74 | 1.96 | 2.00 | 1.94 |
| | 10 | 38.20 | 30.24 | 25.72 | 24.70 | 21.18 | 18.92 | 6.28 | 3.30 | 2.04 | 1.98 | 2.02 |
| | 20 | 47.60 | 37.06 | 31.90 | 31.26 | 29.56 | 27.82 | 6.12 | 3.06 | 1.88 | 1.84 | 1.90 |

<Results>

It was confirmed that the valve operating pressure and the valve operating pressure retention rate significantly decreased as the temperature exceeded 100° C. when, the polypropylene content was 20 to 40% by mass in the presence of an inorganic substance as shown in the graphs of FIGS. 2 and 3. This is consistent with the fact that in the DSC curve of FIG. 3, an endothermic peak was observed at 140 to 150° C. when the polypropylene content was 20 to 40% by mass.

Figure 4:
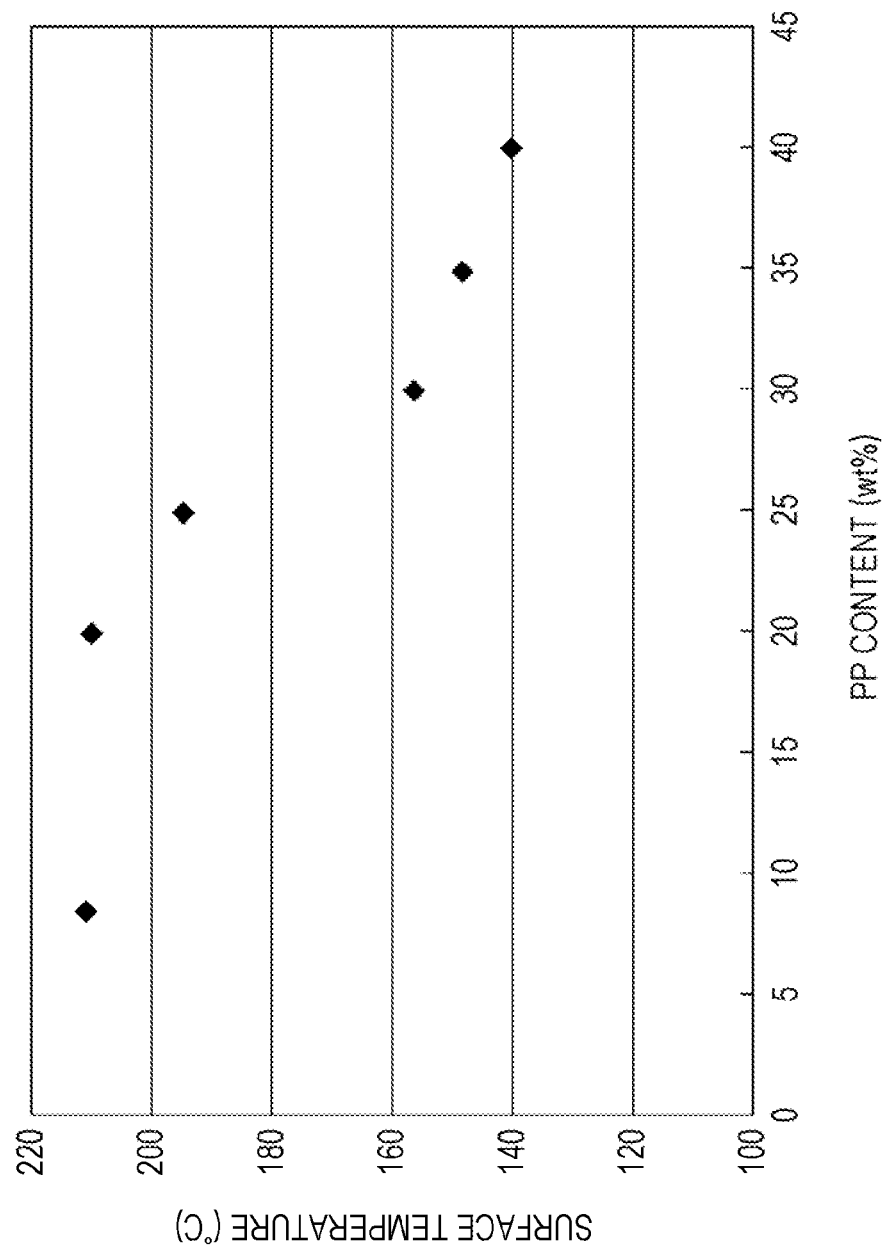
FIG. 4 is a graph showing a surface temperature of a battery when an external short circuit test is conducted on a nickel-metal hydride storage battery of each of Examples and Comparative Example in test 1.

As shown in FIG. 4, a rise in temperature at the time of an external short circuit was properly suppressed when the polypropylene content was 25% by mass or more. In particular when the polypropylene content is more than 30% by mass, a rise in surface temperature is significantly suppressed.

On the other hand, for the effect of adding carbon black, the valve operating pressure retention, rate rapidly decreased with a temperature of approximately 130° C. as a border irrespective of the carbon black content as shown in Table 3, but when the carbon black content was 20% by mass or more, the valve operating pressure at normal temperature exceeded 40×10² kPa at which problems may occur such as popping out and deformation of a cap member.

What is claimed is:

1. An alkaline storage battery comprising:
   a bottomed container case opened at one upper end;
   a winding-type electrode group;
   a sealing plate sealing the upper end open with a gasket;
   a positive electrode lead electrically connecting a positive electrode plate of the winding-type electrode group to the sealing plate;
   a cap member comprising a flange portion, the cap member being a positive electrode terminal, the flange portion being attached on an outer surface of the sealing plate;
   a valve chamber surrounded by the sealing plate and the cap member; and
   a rubber valve body comprising a rubber composition, the rubber composition consisting of ethylene propylene rubber, 20 to 40% by mass of a resin, 1 to 9% by mass of zinc oxide, and 10% by mass or less of carbon black with respect to a total amount of the rubber composition,
   wherein the melting point of the resin is in a range of 100 to 165° C.,
   the rubber valve body is in a compressed state in the valve chamber, and the rubber valve body is provided so as to close the upper end open of the bottomed container case.

2. The alkaline storage battery according to claim 1, wherein the resin is selected from a group consisting of a polyolefin resin, a polyester resin, a polyamide resin, and a polyacetal resin.

3. The alkaline storage battery according to claim 1, wherein the resin is selected from a group consisting of polyethylene and polypropylene.

4. The alkaline storage battery according to claim 1, wherein the resin is selected from a group consisting of a polyolefin resin, a polyester resin, a polyamide resin, a polyacetal resin, a vinyl resin, an acryl resin, and a polycarbonate resin.

5. The alkaline storage battery according to claim 1, wherein the resin includes polyolefin.

6. The alkaline storage battery according to claim 1, wherein the rubber composition has an endothermic peak at 100 to 150° C.

7. The alkaline storage battery according to claim 1, wherein the total content of the zinc oxide and the carbon black in the rubber composition is 5 to 17% by mass.

8. The alkaline storage battery according to claim 1, wherein the degree of crystallinity of the resin contained in the rubber composition is 9 to 12%.

* * * * *